(12) United States Patent
Schenk et al.

(10) Patent No.: US 10,144,067 B2
(45) Date of Patent: Dec. 4, 2018

(54) BAR FEEDING DEVICE

(71) Applicant: LNS Management SA, Orvin (CH)

(72) Inventors: Mark Schenk, Taipei (TW); Romain Sumi, Marin-Epagnier (CH)

(73) Assignee: LNS Management SA, Orvin (CH)

( * ) Notice: Subject to any disclaimer, the term of this patent is extended or adjusted under 35 U.S.C. 154(b) by 0 days.

(21) Appl. No.: 15/103,379

(22) PCT Filed: Dec. 11, 2013

(86) PCT No.: PCT/EP2013/076243
§ 371 (c)(1),
(2) Date: Jun. 10, 2016

(87) PCT Pub. No.: WO2015/086064
PCT Pub. Date: Jun. 18, 2015

(65) Prior Publication Data
US 2016/0311029 A1    Oct. 27, 2016

(51) Int. Cl.
*B23B 13/02*     (2006.01)
*B23B 13/08*     (2006.01)
*B23Q 7/04*      (2006.01)
*B23Q 11/08*     (2006.01)

(52) U.S. Cl.
CPC ............ *B23B 13/021* (2013.01); *B23B 13/08* (2013.01); *B23Q 7/042* (2013.01); *B23Q 11/08* (2013.01)

(58) Field of Classification Search
CPC ........ B23B 13/021; B23B 13/08; B23Q 7/042
USPC ......................................................... 82/126
See application file for complete search history.

(56) References Cited

U.S. PATENT DOCUMENTS

| 3,447,694 A | * | 6/1969 | Hartle | .................... B23B 13/00 |
| | | | | 414/15 |
| 3,613,487 A | * | 10/1971 | Werkmeister | ........... B23B 13/00 |
| | | | | 82/125 |
| 4,649,779 A | * | 3/1987 | Juillerat | ................ B23B 13/027 |
| | | | | 414/17 |

(Continued)

FOREIGN PATENT DOCUMENTS

| DE | 102007004726 | 7/2008 |
| EP | 1321223 | 6/2003 |

(Continued)

OTHER PUBLICATIONS

European Patent Office, International Search Report and Written Opinion of The International Searching Authority, Forms PCT/ISA/210 (2 pgs) and PCT/ISA/237 (5 pgs) dated Jan. 31, 2014.

*Primary Examiner* — Ronald P Jarrett
(74) *Attorney, Agent, or Firm* — Wood Herron & Evans LLP (57) ABSTRACT

A bar feeding device, for example for a lathe, and a process for using a bar feeding device This bar feeding device comprises: a base extending lengthwise, a channel cover extending lengthwise and rotatably connected to the base, a guiding member comprising a guiding channel extending lengthwise, a pusher flag, a mover, such as an endless chain, fastened to a first end of the pusher flag and able to move the pusher flag lengthwise, a push bar able to move within the guiding channel and fastened to a second end of the pusher flag. The channel cover comprises at least one displaceable member and an displacer for actively displacing the displaceable member relative to the channel cover.

13 Claims, 4 Drawing Sheets (56) References Cited

U.S. PATENT DOCUMENTS

| | | | | |
|---|---|---|---|---|
| 7,302,877 B2* | 12/2007 | Cucchi | ................ | B23B 13/123 |
| | | | | 82/124 |
| 8,453,544 B2* | 6/2013 | Cucchi | .................... | B23B 13/04 |
| | | | | 82/1.11 |
| 2003/0159554 A1* | 8/2003 | Cucchi | ................ | B23B 13/123 |
| | | | | 82/126 |

FOREIGN PATENT DOCUMENTS

| | | |
|---|---|---|
| EP | 1338362 | 8/2003 |
| GB | 492252 | 9/1938 |

* cited by examiner

BAR FEEDING DEVICE

This application claims priority, under Section 371 and/or as a continuation under Section 120, to PCT Application No. PCT/EP2013/076243, filed on Dec. 11, 2013.

BACKGROUND OF THE INVENTION

A conventional bar feeding device is represented in FIGS. 1 to 5. It generally comprises:
- a base 1 extending lengthwise,
- a channel cover 4 extending lengthwise and rotatably connected to said base 1,
- a guiding member 7 comprising a guiding channel 8 extending lengthwise,
- a pusher flag 12,
- a chain 13 fastened to a first end of said pusher flag 12 and able to move it lengthwise,
- a push bar 9 able to move within said guiding channel 8 and fastened to a second end of said pusher flag 12.

Figure 5:
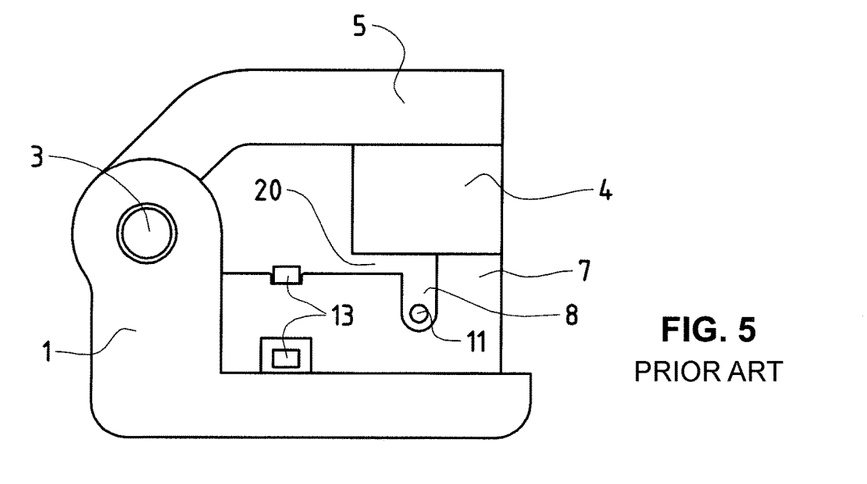
FIG. 5: a cross-sectional view of the bar feeding device of FIG. 1 without the pusher flag, in a closed position.

With such a bar feeding device, as particularly visible in FIG. 5, there is a gap 20 between the channel cover 4 and the guiding member 7. This gap 20 extends lengthwise along the entire base 1 and it serves to allow the pusher flag 12 to pass between the channel cover 4 and the guiding member 7. However, small diameter bars can escape through it, which may lead to damages to the bars themselves, the pusher flag 12 and/or the chain 13 and to an interruption of the production.

SUMMARY OF THE INVENTION

The main object of the invention is to solve the above problem created by the existence of said gap 20.

According to the invention, this object is achieved by a bar feeding device wherein the channel cover comprises at least one displaceable member as well as means for displacing said displaceable member.

Advantageous features of the bar feeding device of the invention are indicated in the following items:
  Bar feeding device, wherein channel cover is pivotable between an opened position and a closed position and said displaceable member is displaceable between a retracted position and an extended position.
  Bar feeding device, wherein in the closed position of channel cover and in the extended position of displaceable member, displaceable member closes said guiding channel.
  Bar feeding device, wherein in the closed position of channel cover and in the retracted position of displaceable member, a gap is formed between said displaceable member and said guiding member for the passage of at least a part of said pusher flag.
  Bar feeding device, wherein
  said channel cover is connected to said base by means of brackets, each bracket having a first portion, the end of which is rotatably connected to said base and a second portion holding said channel cover, and wherein
  in the extended position of displaceable member, the distal face of said second portion substantially levels with the external face of displaceable member.
  Bar feeding device, further comprising at least one detection means for registering the movement of said pusher flag.
  Bar feeding device, wherein said displaceable member comprises a plurality of displaceable sections arranged lengthwise and wherein a plurality of displacing means are provided for individually displacing each displaceable section.
  Bar feeding device, further comprising a plurality of detection means which are arranged lengthwise in order to register the movement of said pusher flag.
  Bar feeding device, wherein said displacing means are able to be actuated in response to (a) signal(s) from said detection means.
  Bar feeding device, wherein said displacing means is/are (a) pneumatic cylinder(s).
  Bar feeding device, wherein said detection means is a sensor or a plurality of sensors.
  Bar feeding device, wherein said sensor(s) is/are photoelectric sensor(s) or contact sensor(s).

The invention also relates to a method for using the bar feeding device of the invention comprising the following steps:
  introducing a bar stock into the guiding channel of the guiding member,
  actuating the displacing means of said channel cover in order to bring the displaceable member in its extended position,
  pivoting the channel cover about the base so that displaceable member comes into contact with said guiding member,
  actuating said moving means in order to move lengthwise the pusher flag, the push bar and the bar stock,
  actuating at an appropriate time said displacing means so that they displace said displaceable member towards the retracted position in order to let at least a part of said pusher flag pass between said guiding member and said displaceable member.

Advantageous features of this method appear in the following items:
  Process, wherein said displacing means are actuated upon reception of (a) signal(s) from said detection means.
  Process, wherein said displaceable sections are sequentially displaced.

BRIEF DESCRIPTION OF THE DRAWINGS

Other features and advantages of the invention will now be described in detail in the following disclosure which is given with reference to the appended figures which schematically represent.

DETAILED DISCLOSURE OF THE INVENTION

The bar feeding device according to the invention is represented in FIGS. 6 to 10.

Most of its parts are similar to those of the prior art feeding device represented in FIGS. 1 to 5. They are therefore denoted by the same reference numbers.

Figure 6:
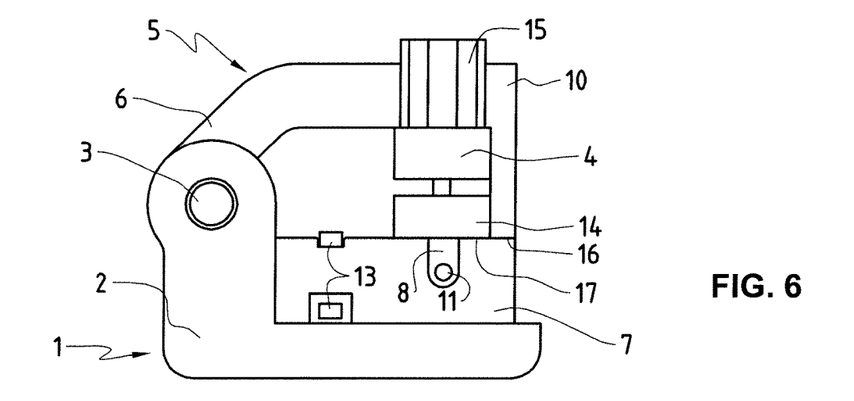
FIG. 6: a cross-sectional view of a bar feeding device of the invention in a closed position, with the displaceable member in an extended position and without the pusher flag.
Figure 7:
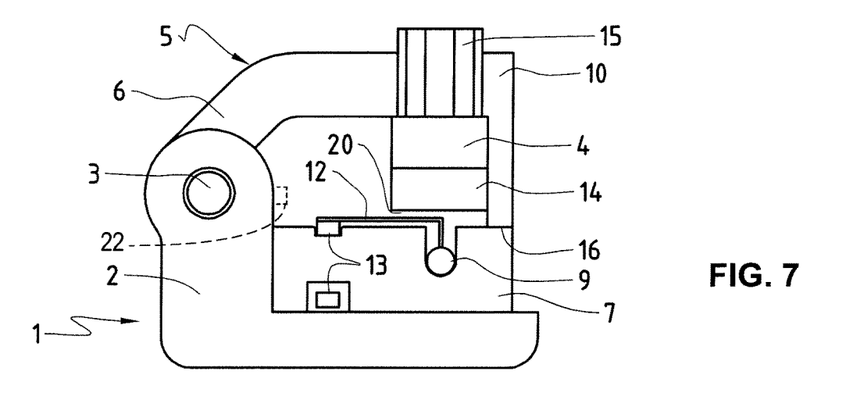
FIG. 7: a cross-sectional view of the bar feeding device of FIG. 6 with the displaceable member in a retracted position and showing the pusher flag.

The bar feeding device has a base 1 which may comprise support members 2 rigidly connected by a shaft 3 extending lengthwise, a channel cover 4 extending lengthwise and which may connected to base 1 by means of brackets 5, each bracket 5 having a first portion with an end 6 connected to shaft 3 in a way that it can freely rotate about it and a second portion 10 to which channel cover 4 is fastened.

Channel cover 4 may globally have a parallelepipedic form.

A guiding member 7 extends lengthwise and comprises a guiding channel 8 extending parallely to shaft 3. Guiding channel 8 is opened upwards for receiving a push bar 9 for pushing bar stocks 11 lengthwise within guiding channel 8.

Guiding member 7 may globally have a parallelepipedic form and it may at least partially lie on base 1, as illustrated in FIGS. 6 and 7.

Push bar 9 is fastened to an end of a pusher flag 12, which may globally have an L-shape in order to penetrate into guiding channel 8. Another end of pusher flag 12 is fastened to moving means 13, which may be an endless chain or any appropriate system able to move pusher flag 12 lengthwise. In case an endless chain is used, grooves 18 and 19 may be provided at appropriate locations respectively in the upper and bottom faces of guiding member 7 for the passage of the chain. Means (not shown) like toothed wheels driven by a motor (in particular a servo motor), may be used to rotate the endless chain in a known manner.

According to the invention and as illustrated in particular by FIGS. 6 and 7, channel cover 4 comprises at least one displaceable member 14 and means 15 for displacing this displaceable member 14 relatively to channel cover 4, between an extended position visible in FIG. 6 and a retracted position visible in FIG. 7. Displaceable member 14 is movably connected to channel cover 4 in a manner known per se.

Displaceable member 14 may globally have a parallelepipedic form and may substantially have the same dimensions as channel cover 4.

Displacing means 15 may be a pneumatic cylinder, a solenoid or any appropriate actuator which can quickly displace member 14 from one position to the other.

As apparent in FIG. 6, when displaceable member 14 is in the extended or lower position, its distal or external face 17 closes the opened side of guiding channel 8 and thereby prevents bar stock 11 from escaping guiding channel 8. It goes without saying that the front and back openings of guiding channel 8, that are located on both longitudinal sides of guiding member 7, are never closed by displaceable member 14.

As visible in FIG. 7, when displaceable member 14 is in the retracted or upper position, a gap 20 is created between guiding member 7 and displaceable member 14. Pusher flag 12 driven by chain 13 can then freely pass inside gap 20. The end or distal face 16 of the second portions 10 of bracket 5 abuts against guiding member 7, so that the weight of channel cover 4, displaceable member 14, displacing means 15 and to some extent bracket 5 is supported by distal face 16.

It is preferred that in the extended position (FIG. 6) the lowest external face 17 of displaceable member 14 substantially levels with the distal face 16 of second portion 10 of bracket 5, so that not only external face 17 but also distal face 16 are in contact with guiding member 7. Otherwise, if the length of second portion 10 is too short, the switch from the extended position to the retracted position will cause distal face 16 to fall and come into contact with guiding member 7, which would produce noise and could also in the long run damage bracket 5 if the weight of channel cover 4 and displacing means 15 is important.

On the other hand and as understandable from FIG. 6, in the closed position of the bracket 5 and the extended position of displaceable member 14, distal face 16 should not significantly protrude downwards from external face 17, otherwise guiding channel 8 would not be efficiently closed and there would still be a risk that a bar 11 could exit through the unclosed or insufficiently closed upper side of guiding channel 8.

At least one detector 22 may be provided in order to sense the movement of said pusher flag 12. The displacing means 15 may then be actuated in response to a signal from said detector 22 and accordingly lift the displaceable member 14 before the arrival of pusher flag 12, allowing thereby the latter to move between external face 17 of displaceable member 14 and the upper face of guiding member 7. Said detector 22 can be a sensor (or a group of sensors) which record the position and/or movement of the pusher flag 12 in a known manner. On the other hand, it would also be possible to use a different approach for determining the position and the movement of the pusher flag 12. In particular, if a servo drive is used for driving the pusher flag 12, its built-in encoder which automatically senses the position could be used for controlling the movement of the pusher flag 12.

Figure 8:
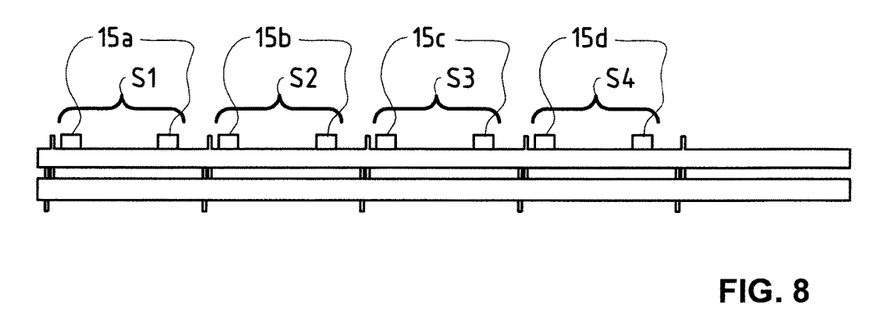
FIG. 8: a side view of the bar feeding device of a preferred embodiment of the invention.

According to a preferred embodiment of the invention illustrated in FIG. 8, the displaceable member 14 is divided lengthwise and into a plurality of displaceable sections S1, S2, S3, S4, etc. and a plurality of displacing means 15a, 15b, 15c, 15d, etc. are provided for independently displacing each displaceable section.

Referring to the movement of push bar 9 within guiding channel 8, section S1 can be considered as being located upstream and S4 downstream.

In case sensors are used, it is preferable to have a plurality of them arranged lengthwise in order to sense the passage of the pusher flag 12. The sensors may be photoelectric sensors, contact sensors or any appropriate sensors.

Example of Process for Using the Bar Feeding Device of the Invention

Figures 1, 2, 3:
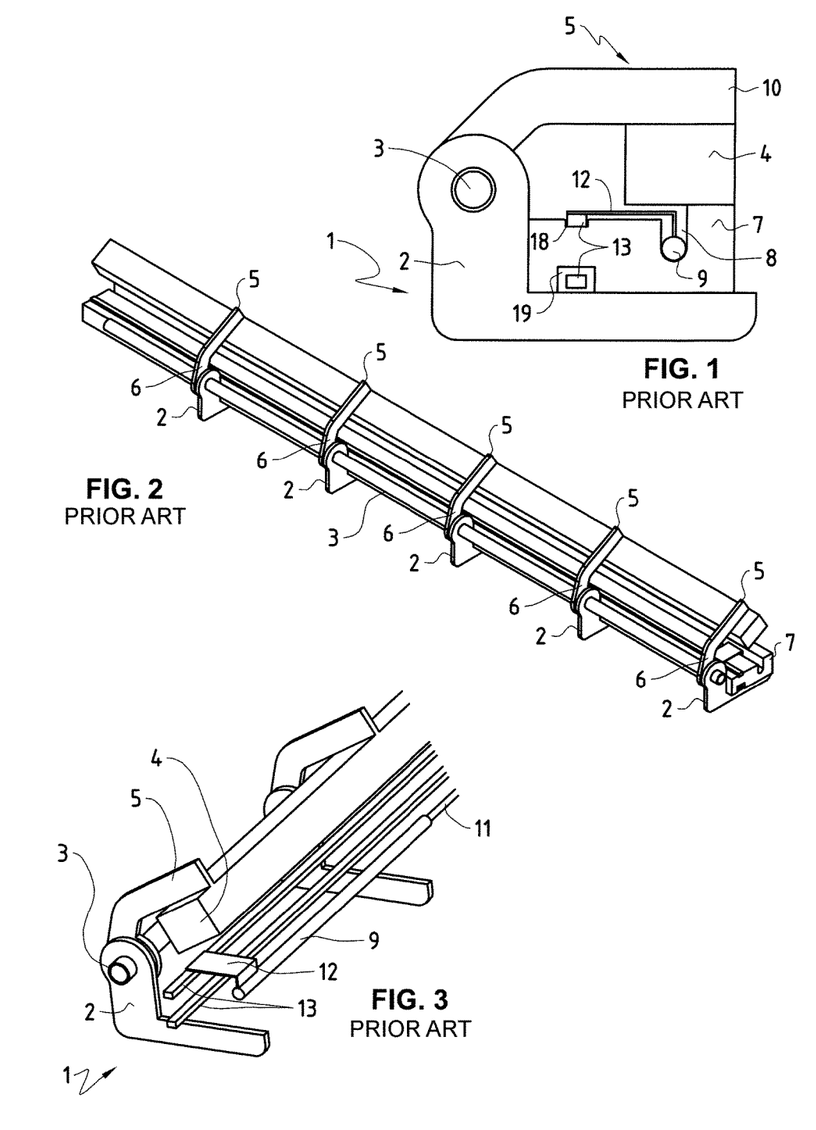
FIG. 1: a cross-sectional view of a bar feeding device of the prior art.
FIG. 2: a perspective view from the left-hand side of the bar feeding device of FIG. 1 without the guiding member.
FIG. 3: a perspective view from the right-hand side of the bar feeding device of FIG. 1 without the guiding member.
Figure 4:
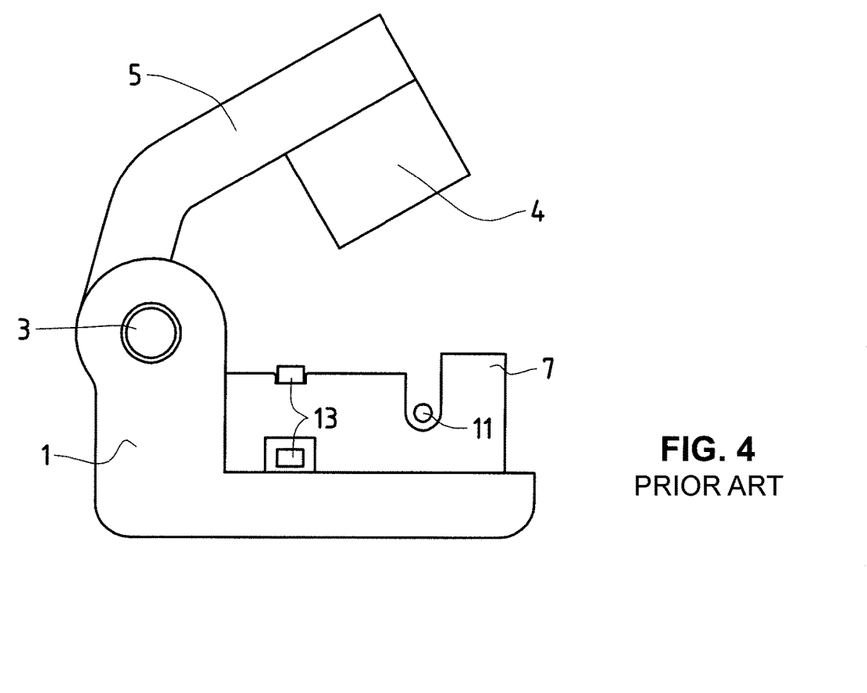
FIG. 4: a cross-sectional view of the bar feeding device of FIG. 1 without the pusher flag, in an opened position.

Each bracket 5 is able to pivot between an opened position similar to that illustrated in FIGS. 3 and 4. and a closed position visible in FIGS. 6 and 7, wherein the external face 17 of displaceable member and preferably the distal face 16 of second portion 10 abut against guiding member 7.

In the beginning of the process, brackets 5 are all in the opened position and the displaceable member 14 is in the extended position visible in FIG. 6.

A bar stock 11 is introduced into guiding channel 8 as illustrated for the prior art in FIG. 4.

Brackets 5 are then pivoted about shaft 3 until they reach the closed position. As a result, the displaceable member 14 then contacts guiding member 7 and closes the opened side of guiding channel 8.

The moving means 13 are then actuated and move the pusher flag 12, the push bar 9 and the bar stock 11 lengthwise.

In case a sensor is used, it is preferably located downstream of the pusher flag 12 and upstream of the displaceable member 14. Thus, when the sensor detects that pusher flag 12 approaches, it sends a signal to directly or indirectly (for example via appropriate electronic means) actuate displacing means 15, so that they can lift the displaceable member 14, thus creating the gap 20 for the passage of pusher flag 12. If the encoder of the servo drive is used, it can be used for sending the appropriate signal in order to actuate the displacing means 15.

In the preferred embodiment where the external face 17 of displaceable member 14 levels with the distal face 16 of said second portion 10 of said bracket 5, the displaceable member 14 need not be in the extended position since the beginning: displacing means 15 may bring the displaceable member in the extended position only after the brackets 5 are in the closed position.

In the preferred embodiment illustrated in FIG. 8, when the first sensor, i.e. the sensor located most upstream, or the encoder of the servo drive register the passage of pusher flag 12, a signal is sent to the displacing means of the first section S1, which upwardly displaces the displaceable members 14 of first section S1, so that pusher flag 12 may pass between external face 17 of the displaceable member 14 and the guiding member 7.

Pusher flag 12 then pursues its lengthwise movement until its position is registered in the second section S2, which will cause the upward displacement of the displaceable members 14 of the second section S2, and so on.

Thus, if sensors are used, the first sensor is located downstream of pusher flag 12 and upstream of the first section S1, the second sensor is located downstream of the first sensor and upstream of the second section S2, and so on.

Alternate Forms

Figure 9:
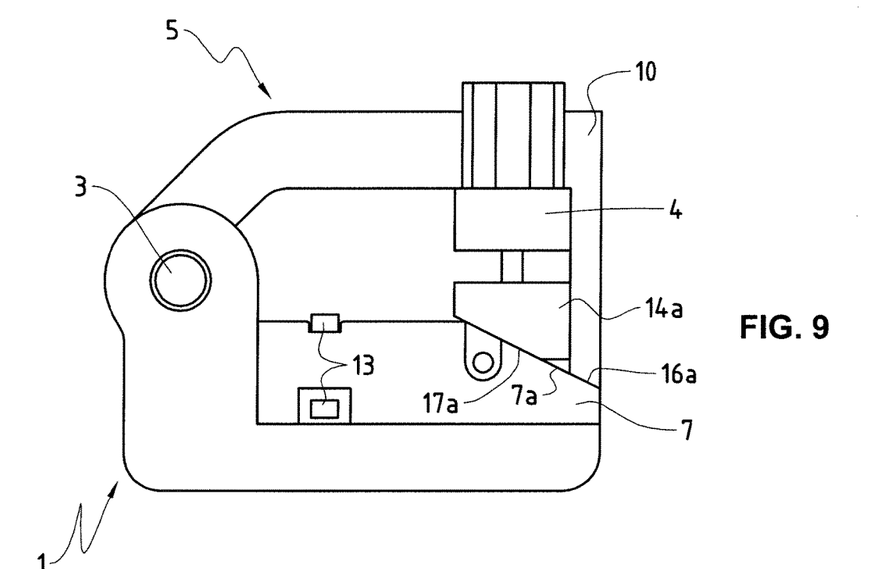
FIG. 9: a cross-sectional view of an alternate embodiment of the bar feeding device of the invention without the pusher flag.

FIG. 9 shows an alternate form 14a of the displaceable member wherein the external face 17 has an inclined portion 17a which cooperates with an inclined face 7a of guiding member 7 in order to close the opened side of guiding channel 8 in the extended position of displaceable member 14a. Distal face 16 of bracket 5 is preferably also conformed to be parallel - in the closed position of bracket 5 - to upper face 7a of guiding member 7.

Second portion 10 of bracket 5 does not necessarily have a L-form as illustrated in FIGS. 6, 7 and 9.

Figure 10:
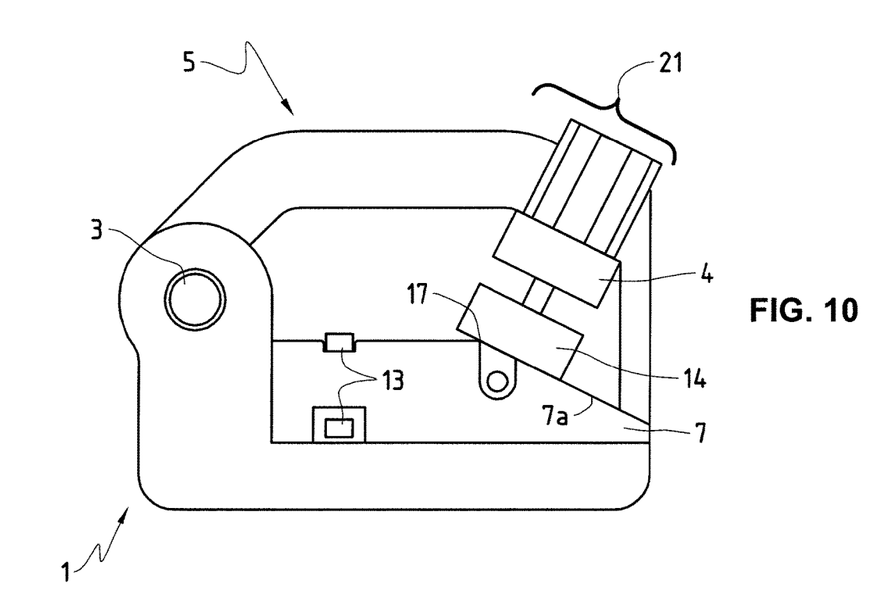
FIG. 10: a cross-sectional view of a further alternate embodiment of the bar feeding device of the invention without the pusher flag.

FIG. 10 shows an alternate form of bracket 5, which has an inclined section 21 parallel to an inclined upper face 7a of guiding member 7. The displacing direction of displacing member 14 is also inclined, i.e. perpendicular to inclined face 7a and external face 17 of displaceable member 14 still closes the opened side of guiding channel 8 in the extended position.

Although the present disclosure has been described with reference to particular means, materials and embodiments, one skilled in the art can easily ascertain from the foregoing description the essential characteristics of the present disclosure, while various changes and modifications may be made to adapt the various uses and characteristics without departing from the spirit and scope of the present invention as set forth in the following claims.

The invention claimed is:

1. A bar feeding device comprising:
   a base extending lengthwise,
   a guiding member,
   a channel cover extending lengthwise and comprising:
      a frame rotatably connected to said base and pivotable between closed and opened positions, wherein in the closed position said guiding member and said channel cover collectively define a guiding channel extending lengthwise, and wherein in the opened position said guiding channel is laterally open lengthwise for placing a stock bar therein,
      a plurality of displaceable sections, each partly defining said guiding channel, and
      a plurality of displacers, each of said plurality of displacers displacing a corresponding displaceable section relative to said frame between first and second positions, wherein in the closed position of said channel cover said guiding channel is laterally closed when and where any of said displaceable sections is in the first position, and wherein in the closed position of said channel cover a lateral gap, laterally opening said guiding channel, is formed between said guiding member and at least one of said displaceable sections when and where any of said displaceable sections is in the second position,
   a pusher flag that extends through said lateral gap when said pusher flag is moved along said displaceable sections from said guiding channel to an outside of said guiding member and said channel cover, said pusher flag comprising:
      a first end that is outside said guiding member and said channel cover, and
      a second end that is inside said guiding channel,
   a mover fastened to said first end of said pusher flag and able to move said pusher flag lengthwise, and
   a push bar able to move within said guiding channel and fastened to said second end of said pusher flag.

2. The bar feeding device according to claim 1,
   wherein said channel cover is connected to said base using a bracket having a first portion, the end of which is rotatably connected to said base and a second portion holding said channel cover, and
   wherein in the first position of said plurality of displaceable sections, a distal face of said second portion substantially levels with an external face of said plurality of displaceable sections.

3. The bar feeding device according to claim 1, further comprising at least one detector for registering the movement of said pusher flag.

4. The bar feeding device according to claim 3, wherein said plurality of displacers are able to be actuated in response to (a) signal(s) from said detector.

5. The bar feeding device according to claim 3, wherein said detector is a sensor or a plurality of sensors.

6. The bar feeding device according to claim 5, wherein said sensor(s) is/are photoelectric sensor(s) or contact sensor(s).

7. The bar feeding device according to claim 1, further comprising a plurality of detectors which are arranged lengthwise in order to register the movement of said pusher flag.

8. The bar feeding device according to claim 1, wherein said plurality of displacers for actively displacing said plurality of displaceable sections relative to said channel cover are pneumatic cylinders.

9. The bar feeding device according to claim 1, wherein each of said plurality of displacers displace said corresponding displaceable sections sequentially so that said pusher flag passes through said lateral gap between each displaceable section and said guiding member as said pusher flag moves downstream.

10. The bar feeding device according to claim 1, wherein each displaceable section includes an inclined portion that cooperates with an inclined face of said guiding member in the closed position and the first position.

11. A method for using a bar feeding device, the bar feeding device including a base extending lengthwise, a guiding member, a channel cover extending lengthwise and including a frame rotatably connected to the base and pivotable between closed and opened positions, a plurality of displaceable sections, each partly defining a guiding channel, and a plurality of displacers each of the plurality of displacers displacing a corresponding displaceable section relative to the frame between first and second positions, the bar feeding device also including a pusher flag, a mover fastened to a first end of the pusher flag and able to move the pusher flag lengthwise, a push bar able to move within the guiding channel and fastened to a second end of the pusher flag, the method comprising:
introducing a bar stock into the guiding channel of the guiding member that is laterally open lengthwise when the channel cover is in the opened position,
actuating the plurality of displacers from the second position to the first position relative to the frame,
pivoting the channel cover about the base from the open position to the closed position so that the plurality of displaceable sections come into contact with the guiding member, wherein the guiding member and the channel cover collectively define a guiding channel extending lengthwise,
actuating the mover in order to move the pusher flag, the push bar and the bar stock lengthwise, and
actuating each displacer so as to displace each displaceable section towards the second position relative to the frame in order to let at least a part of the pusher flag pass through a lateral gap between the guiding member and at least one of the displaceable sections which is in the second position, wherein the guiding channel is laterally closed where at least one of the displaceable sections is in the first position, wherein the pusher flag extends through the lateral gap from the guiding channel to an outside of the guiding member and the channel cover, the first end of the pusher flag being outside the guiding member and the channel cover, and the second end being inside the guiding channel.

12. The method according to claim 11,
wherein the bar feeding device includes at least one detector for registering the movement of the pusher flag, and
wherein the plurality of displacers are actuated upon reception of (a) signal(s) from the at least one detector.

13. The method according to claim 12, wherein the displaceable sections are sequentially displaced.

* * * * *

UNITED STATES PATENT AND TRADEMARK OFFICE
CERTIFICATE OF CORRECTION

PATENT NO. : 10,144,067 B2
APPLICATION NO. : 15/103379
DATED : December 4, 2018
INVENTOR(S) : Mark Schenk et al.

Page 1 of 1

It is certified that error appears in the above-identified patent and that said Letters Patent is hereby corrected as shown below:

On the Title Page

Item [72], "Mark Schenk, Taipei (TW)" should read --Mark Schenk, Taipei City (TW)--

Item [57], second line from end, "member and an displacer" should read --member and a displacer--

In the Specification

Column 1, Lines 5-10, insert --The invention relates to a bar feeding device for example for a lathe and to a process for its use.--

Column 3, Line 15, "which may connected" should read --which may be connected--

Column 4, Line 59, "FIGS. 3 and 4. and a closed" should read --FIGS. 3 and 4 and a closed--

In the Claims

Claim 9, Column 6, Line 68, "displacers displace said" should read --displacers displaces said--

Claim 11, Column 7, Line 15, "plurality of displacers each" should read --plurality of displacers, each--

Signed and Sealed this
Twenty-sixth Day of February, 2019

Andrei Iancu
*Director of the United States Patent and Trademark Office*